(12) United States Patent
Seth et al.

(10) Patent No.: US 6,575,034 B2
(45) Date of Patent: Jun. 10, 2003

(54) CHARACTERIZATION OF ENVIRONMENTAL AND MACHINERY INDUCED VIBRATION TRANSMISSIVITY

(75) Inventors: Brij B. Seth, Canton, MI (US); Balachandra Muniyappa, Westland, MI (US); Evangelos Liasi, Windsor (CA)

(73) Assignee: Ford Global Technologies, L.L.C., Dearborn, MI (US)

( * ) Notice: Subject to any disclaimer, the term of this patent is extended or adjusted under 35 U.S.C. 154(b) by 0 days.

(21) Appl. No.: 09/774,228

(22) Filed: Jan. 30, 2001

(65) Prior Publication Data

US 2002/0129653 A1 Sep. 19, 2002

(51) Int. Cl.$^7$ .................................................. G01H 9/00
(52) U.S. Cl. ........................................................ 73/579
(58) Field of Search ........................ 73/570, 579, 584, 73/593, 594, 649, 658, 659, 660; 702/33, 34, 35, 39

(56) References Cited

U.S. PATENT DOCUMENTS

| | | | |
|---|---|---|---|
| 4,425,798 A | * | 1/1984 | Nagai et al. ............ 73/659 |
| 5,610,336 A | | 3/1997 | Svinkin |
| 5,646,350 A | | 7/1997 | Robinson et al. |
| 5,663,894 A | | 9/1997 | Seth et al. |
| 5,724,271 A | * | 3/1998 | Bankert et al. ............ 73/462 |

FOREIGN PATENT DOCUMENTS

| | | |
|---|---|---|
| EP | 0762248 A1 | 3/1997 |
| WO | WO 97/27477 A1 | 7/1997 |

* cited by examiner

*Primary Examiner*—Richard A. Moller
(74) *Attorney, Agent, or Firm*—Brooks & Kushman P.C.; Damian Porcari

(57) ABSTRACT

A method that simultaneously monitors and captures vibration acceleration signals at locations comprising at least one site sourcing environmental excitations and a target site, which target site is selected from a planned machinery foundation site or one or more sites interfacing between elements of machinery to be placed on such foundation; extracting amplitude and frequency data from the frequency representations of the domains of such signals; quantifying displacement excitations from such data at such locations; and providing transmissivity ratios along the vibration path by summing the displacement excitations at different frequencies at each of the locations and then ratioing the sum at either the planned machinery foundation site or at a selected joint site with the sum at the environmental excitation site, thereby indicating the relative vibration stiffness between such sites. Such transmissivity ratios can then be used to modify the design of the proposed foundation, and/or the design of interfacing elements of the machine.

18 Claims, 4 Drawing Sheets

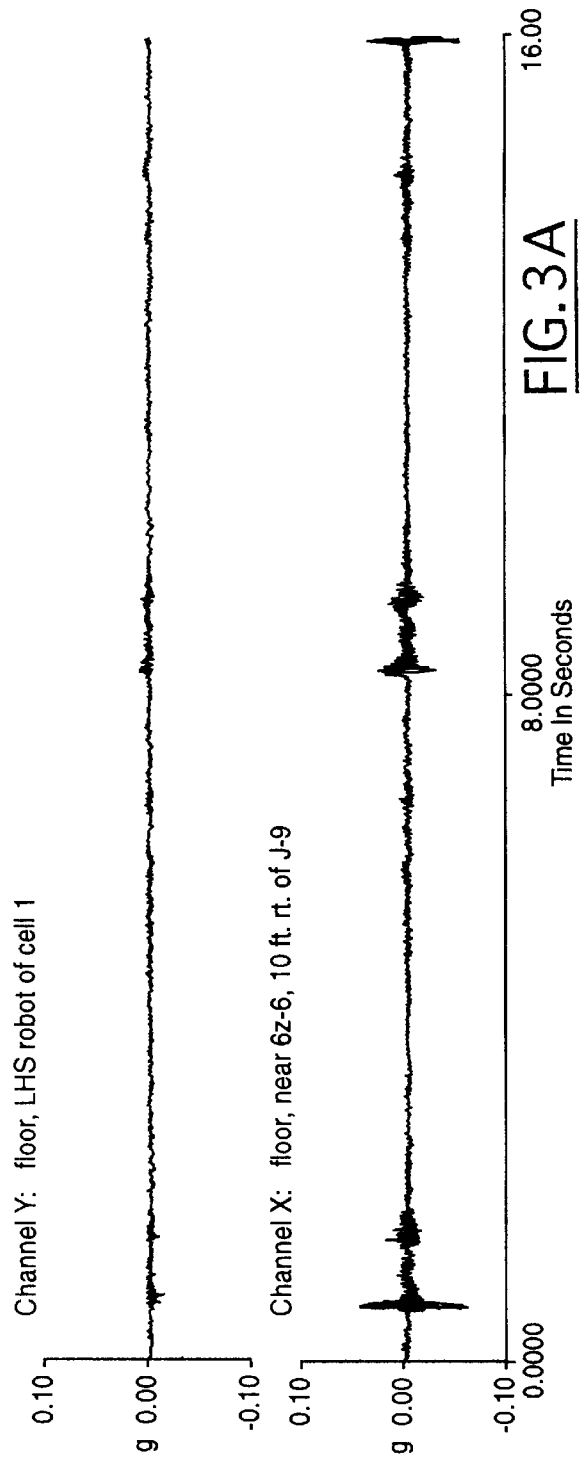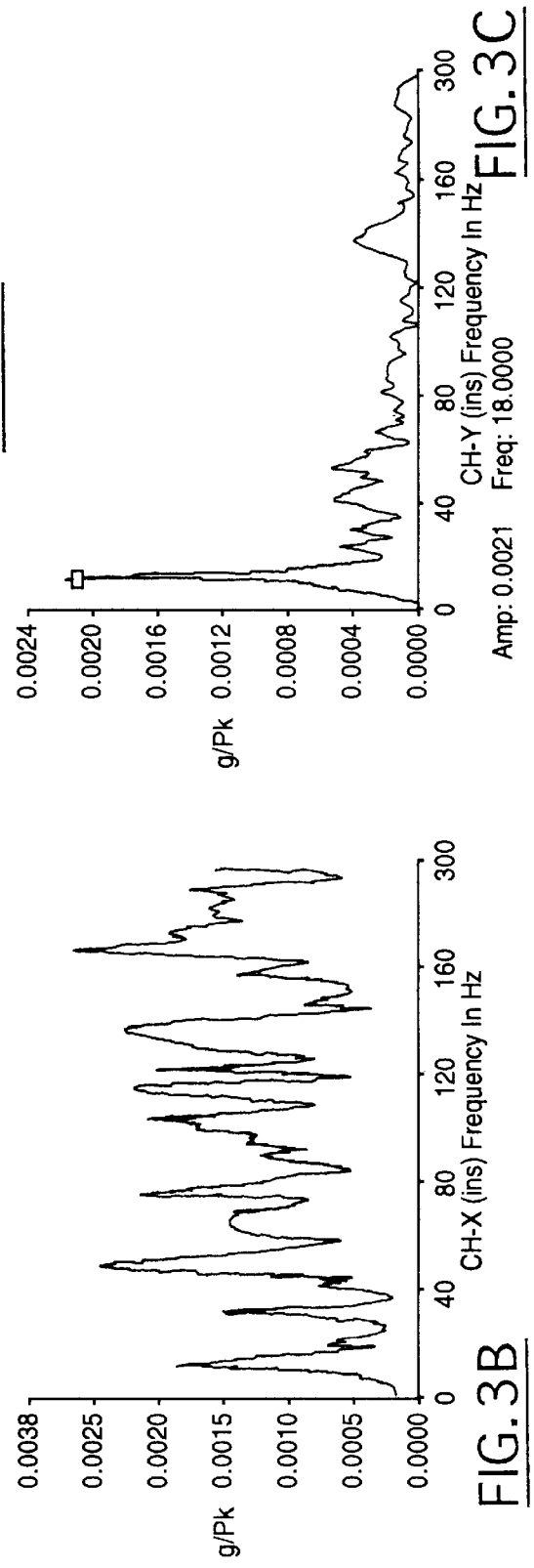
FIG. 3A
FIG. 3B
FIG. 3C

CHARACTERIZATION OF ENVIRONMENTAL AND MACHINERY INDUCED VIBRATION TRANSMISSIVITY

BACKGROUND OF THE INVENTION

1. Technical Field

This invention relates to techniques for understanding vibrational information that will assist in the design, building and installation of dynamic manufacturing machinery and foundations supporting such machinery, and, more particularly, to characterization of vibration transmissivity at various machine element joints and foundation interfaces.

2. Discussion of the Prior Art

With ever increasing demand for higher product quality and machine productivity, particularly in high-volume production environments, analysis of vibrational influences has become more important. However the extent of prior art investigations of vibrational influences has been limited to attempts to understand vibrational signatures of dynamic machining and attempts to quantify low frequency vibrations in soil underlying machine foundations.

In U.S. Pat. No. 5,663,894, vibrational signatures of machines have been characterized by discriminating vibrational activity at various positions on such machines, both with and without machining loads; the vibration signature analysis included both time and frequency domain analysis which was stored in a database for future comparison and tracking. Such disclosure does not deal with vibrations that are derived from the environment and transmitted to the machine, nor does it deal with the quality of transmissivity of vibrations at various sites along the vibration transmission path.

U.S. Pat. No. 5,646,350 discloses a method to detect latent or incipient failure conditions of machinery (such as divots or flat spots on bearings) by isolating the low speed frequency vibrations from high frequency vibrations which tend to drown out the lower frequencies; acceleration units for the sensed vibrations are converted to velocity units and an estimate is made of the most probable noise floor which is then subtracted from the signal data. Again, no attempt is made to characterize the vibration transmissivity along various sites of the vibrational path and no attempt is made to investigate the influence of environmental vibrations.

In the U.S. Pat. No. 5,610,336 a method of designing foundations for machinery is disclosed, consisting of predicting the natural frequency of a proposed machine foundation through measurement of the natural frequency of the soil base (non-linear system) beneath the proposed foundation. Again no attempt is made to investigate transmissivity of vibrations from such soil base to machine elements supported by the foundation.

SUMMARY OF THE INVENTION

It is an object of this invention to provide a method of characterizing environmental and machinery vibrations by a transmissivity discriminator so that design of the machine foundation and machine structural elements can be more effectively made, based on quantitative information concerning the influence of such environmental and machine induced vibrations.

The inventive method herein that meets the above object, comprises the steps of simultaneously monitoring and capturing vibration acceleration signals at locations comprising a source site, which can be ground soil or a foundation through which environmental vibrations pass, and a target site, which can be a planned machinery foundation site or one or more sites containing interfacing joints between elements of the machinery to be placed on such foundation; extracting amplitude and frequency data from the frequency representations of the domains of such signals; quantifying displacement excitations from such data at such locations; providing transmissivity ratios along the vibration path, between the source site and target site, by summing the displacement excitations at different frequencies at each of the locations and then ratioing the sums at either the planned machinery foundation site or at a selected joint site with the sum at the environmental excitation source site, thereby indicating the relative vibration stiffness between such ratioed sites. Such transmissivity ratios can then be used to modify the design of the proposed foundation, and/or the design of interfacing machine elements.

BRIEF DESCRIPTION OF THE DRAWINGS

FIGS. 3A, 3B, and 3C respectively are graphical illustrations of acceleration signals, first in the time domain for FIG. 3A, and thence in the frequency domain for the x and y channels for FIGS. 3B and 3C.

DETAILED DESCRIPTION AND BEST MODE

Figure 1:
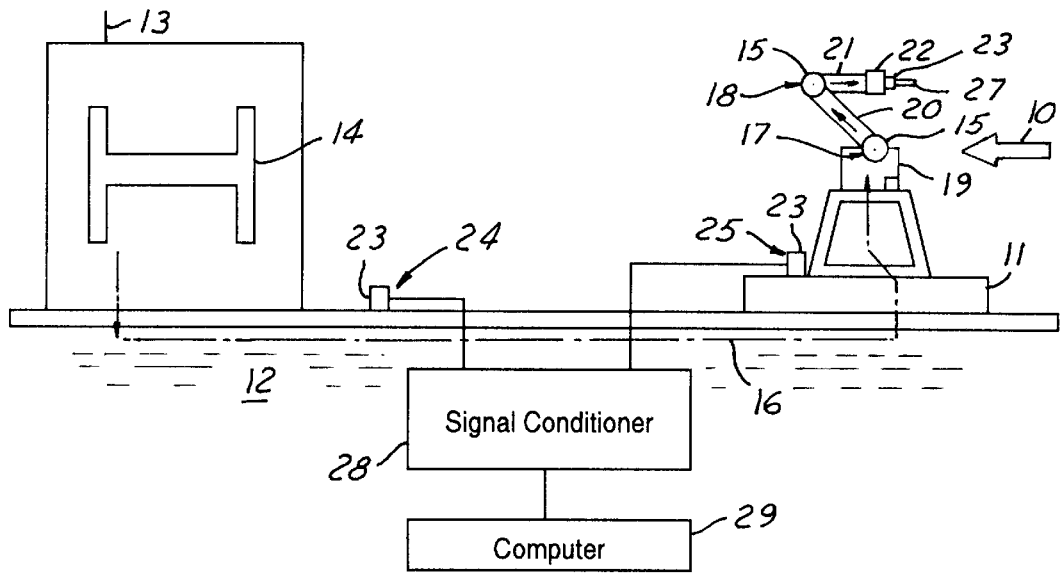
FIG. 1 is a schematic elevational view of apparatus involved in carrying out the inventive method herein.

Referring to FIG. 1, a machining operation, to be carried out by the method herein, uses a machine 10 (such as a robotic laser cutting machine) placed on a proposed foundation 11, which foundation rests on soil or other supporting media 12. A surrounding vibrational excitation source 13, which can comprise other dynamic operating machinery 14 or motors 15 which drive elements of the machine 10, will affect the dynamic stability of the desired machining operation.

Characterization of vibrational transmissivity from the environmental excitation source 13 through the soil 12, foundation 11 and thence through joints 17, 18 (which joints may use drive motors 15) between elements 19, 20, and 21 of the robot, requires placement of acceleration sensors 23 at least at two sites, preferably at the environmental excitation source site 24 and thence at a target site 25, such as at any one of the machine foundation 11 or joints 17, 18 sites. Desirably the target site may also include a robot wrist 22 which holds the working cutting tool 27 and at which a sensor 23 is placed. Signals from such sensors are relayed to a signal conditioner 28 and thence to a computer and data storage device 29 for analysis and mathematical manipulations.

Figure 2:
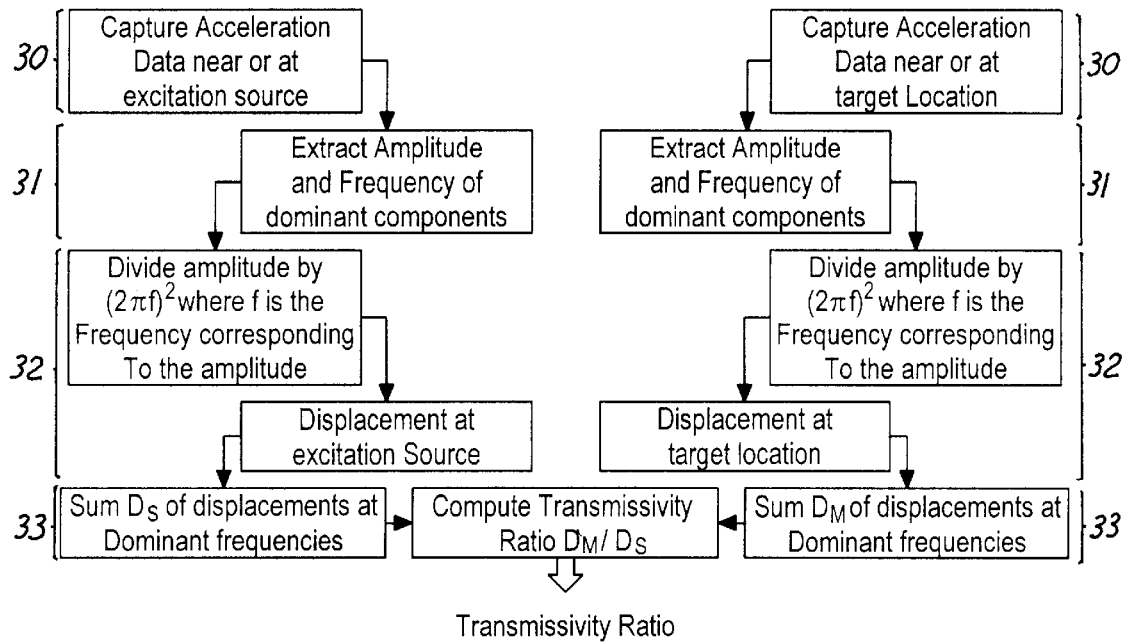
FIG. 2 is a block flow diagram of certain steps of the method.

As shown in FIG. 2, the flow of steps for the characterization method comprises essentially four steps: as shown at 30, vibration acceleration signals are simultaneously captured at least at two sensor sites which sites may comprise the excitation source site on the left hand side of FIG. 2 and the target site shown along the right side of FIG. 2. Secondly, as shown at 31, amplitude and frequency information is extracted from frequency domain representations of such signals. Next, as shown at 32, displacement excitations are quantified from such domains at such locations by dividing the amplitude by $(2\#f)^2$ where f is the frequency corresponding to the amplitude. As shown at 33, calculations of the displacements are then summed for the different site locations at dominant frequencies. The sums are ratioed to provide transmissivity ratios (TR) at the respective sensor sites.

Capturing vibration acceleration signals requires selection and placement of various types of sensors at the desired locations to carry out the first step. Frequency content of the signal of interest, sensor sensitivity, and test environment are important factors in selecting appropriate monitoring sensors. Acceleration measurements provide information relative to the forces acting on various machine components as well as in the environment. In selecting appropriate sensors, shear type piezoelectric accelerometers are desirable because they are available in small sizes and low weights so that they can be attached to various machine elements without distorting the vibration signature. Shear type accelerometers are also less sensitive to temperature variations which may be encountered during a machining cycle. Since the accelerometer will exhibit a highly exaggerated response near its resonant frequency, the typical usable frequency range is about one-third of the resonant frequency. Preferably, the accelerometer should exhibit ruggedness for making measurements in harsh environments, a high sensitivity and a high range (generally up to 100 g). Selection of sensor locations is very important and should be such to provide information on spindle bearings, slides, workpiece, fixturing, machine structure, spindle motors and pumps. Proper attachment of accelerometers to vibrating surfaces is important to obtain accurate measurements. Improper mounting may result in an attenuated response of the sensor, which limits the usable frequency range of the instrument. Good mounting can be achieved with readily available technologies including glue, magnetic mounts, or threaded studs such that the accelerometer makes substantial contact with the surface under test.

A preconditioning of vibrational signals is used to enhance the signal to noise ratio. Appropriate signal amplification combined with low pass and/or high pass filtering is usable in many applications. Filter characteristics, such as the cut-off frequency and slope, are selected according to the type of signal being monitored. Preferably, filters are selected to reject high frequency non-coherent noise in the vibration signal. Since the electrical signals produced by many sensors, such as accelerometers, have small magnitudes, it is desirable to amplify the signals close to their source so as to reduce the effect of electrical noise. Preferably, operational amplifiers are utilized to produce the required amplification. Data acquisition parameters may impose requirements such that capturing signals must be performed at a frequency greater than or equal to twice the highest frequency of the signal being monitored. Time-based sampling digitization is sufficient for many applications. Since the signals provided by various sensors, including accelerometers, are typically analog signals, they must be converted to a digital representation to facilitate processing by the computer.

In capturing accelerometer signals, sensing must be carried out simultaneously for the various sensors located at the environmental source site and one or more target sites. Data acquisition requires apportioning of the recorded information into a number of windows, each consisting of a block of sampled data points, so that Fourier transform can be computed.

In the second step 31, amplitudes and frequencies of the dominant components are extracted from the frequency domain representation of the signal. Frequency domain analysis is performed utilizing the Fourier transform whereby a signal is represented by a finite number of points, which provide content of the signal at different frequencies (see FIG. 3A). This intermediate data reduction facilitates pattern recognition and it's useful in determining the presence of periodic components in complex signals of random or deterministic nature. Amplitude is also a relevant characteristic of the signals which discriminant is obtained by processing the data (see FIG. 3B).

In the third step 32, displacements due to the vibrational excitations at the environmental source site and at the target machine element sites are calculated. This is carried out by using the equations:

$$X_s = \int a_s(t) dt$$

$$X_t = \int a_t(t) dt$$

where s is source, t is target, $X_s$ is the vibrational excitation at the source, $X_t$ is the vibrational excitation at the target, dt is delta time, $a_s$ is the acceleration at the excitation, and at is the acceleration at the target. For linear systems with sinusoidal excitation, displacement at a given frequency $f_n$, is given by:

$$X_s(n) = a_s(n)/(2\pi f_n)2$$

$$X_t(n) = a_t(n)/(2\pi f_n)2$$

Where $a_s(n)$ and $a_t(n)$ are the acceleration amplitudes corresponding to the frequency $f_n$ at the source and at the target, respectively. Total displacements are then given by:

$$X_s = \sum_{n=1}^{p} X_s(n)$$

$$X_t = \sum_{n=1}^{p} X_t(n)$$

where p is the number of dominant frequencies in Fourier transform. The transmissivity ratio (TR) is then given by:

$$TR = X_t/X_s$$

Figure 4:
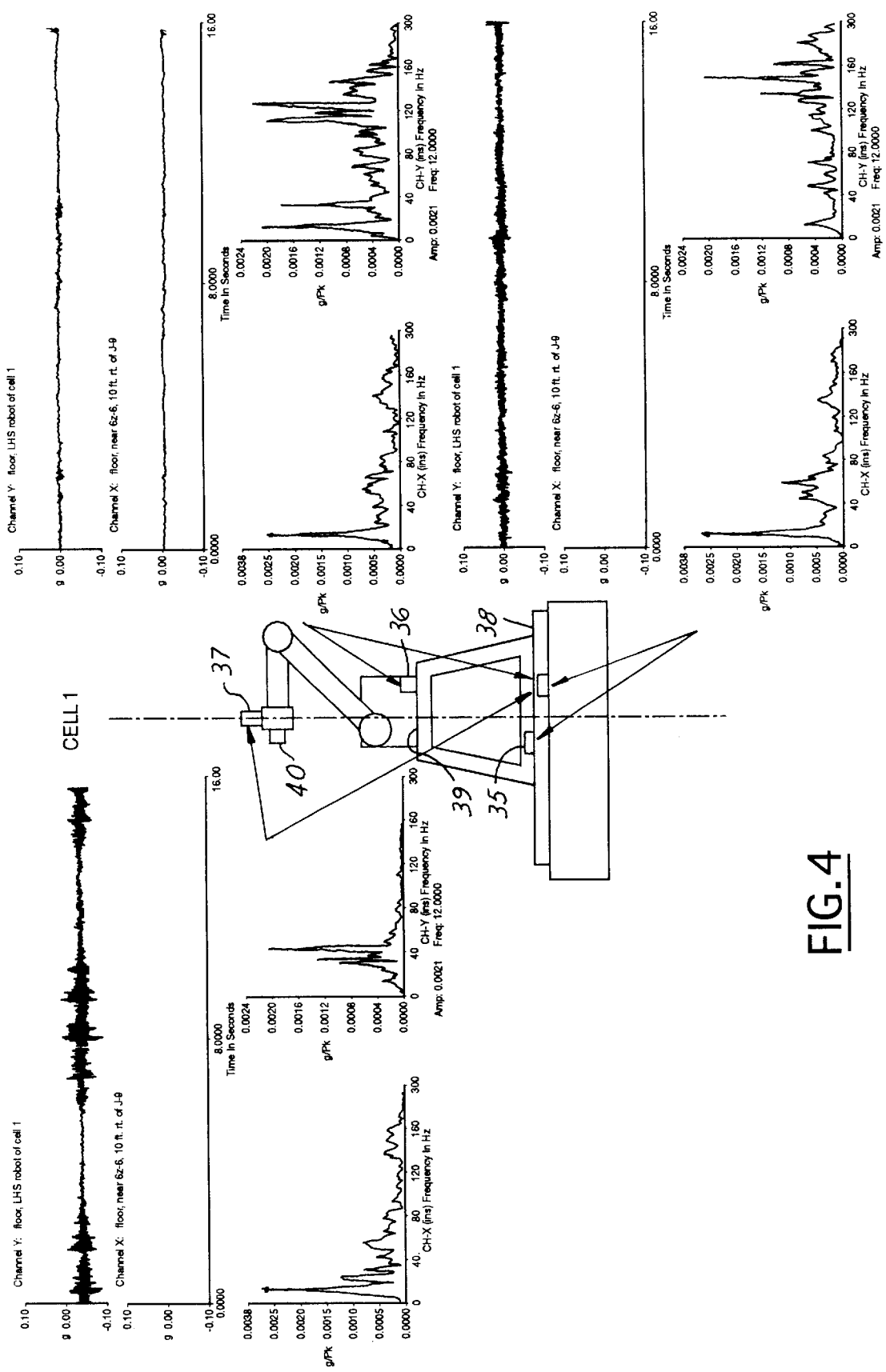
FIG. 4 is a composite view comprising graphical illustrations of acceleration signals similar to that displayed in FIGS. 3A, 3B and 3C, but additionally illustrating an elevational view of a machine and its foundation for demonstrating a greater number of sites on the machine at which such signals were derived.
Figure 5:
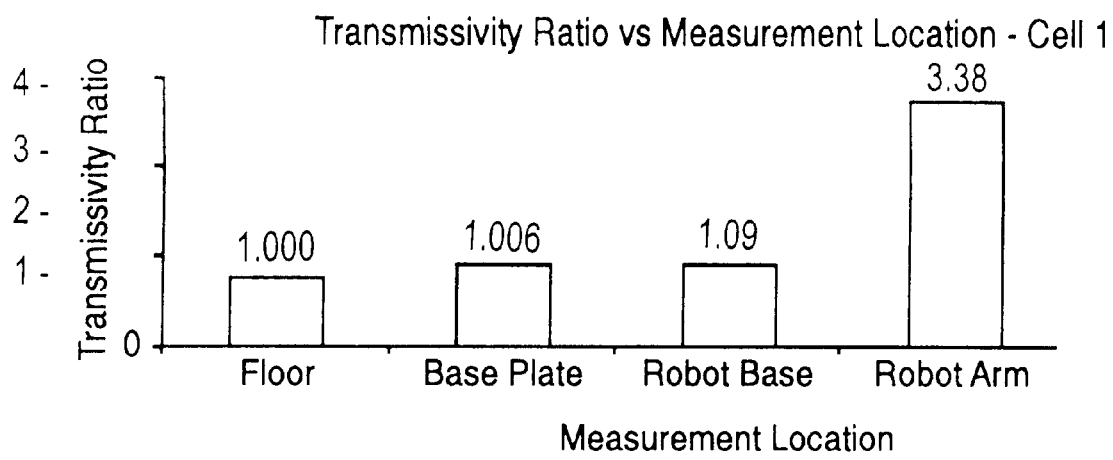
FIG. 5 is a bar graph of transmissivity ratios calculated for the number of sensing sites illustrated in FIG. 4.

Target sensors 35, 36, 37 should advantageously also be placed at the sites (joints) 38, 39, 40, such as represented in FIG. 4. In this manner transmission ratios will be calculated for each such sites (38, 39, 40) in the vibrational path, rendering a stiffness characteristic at each such site relative to the environmental excitations that may be transferred from surrounding machining.or from the drive motor of the robot itself. This information allows the designer of the proposed foundation, and the designer of the robot machine elements to achieve a desired performance at the machine tool location. Actual test data is shown in FIG. 4 associated with the various sites on a laser-cutting robot. The test conditions for each such site, carried out by the method, consists of floor vibration amplitudes in the cell, robot base, and robot wrist. FIG. 5 illustrates the transmissivity ratios for each sensor location described above for FIG. 4. This information tells us that a significant opportunity exists to modify or improve the design of the robot arm in order to enhance the functionality of the robot machine.

While the best mode and viable alternatives for carrying out the invention have been described in detail, those familiar with the art to which this invention relates will recognize various alternative designs and variations for the practicing the invention as defined by the following claims.

We claim:

1. A method of identifying vibrations transmitted through ground soil between an environmental vibration site and a target site, comprising:
    (a) simultaneously monitoring and capturing vibration accelerometer signals at said environmental vibration site and at said target site;
    (b) extracting amplitude and frequency data from the frequency representations of the domains of said signals;
    (c) quantifying displacement excitations from said data; and
    (d) providing transmissivity ratios by summing said displacement excitations at different frequencies at said environmental vibration site to produce a first sum and at said target site to produce a second sum and ratioing the first sum and the second sum, thereby indicating the relative vibrational stiffness between said environmental vibration site and said target site.

2. The method of claim 1, wherein the displacement excitations are quantified for a linear system with sinusoidal excitation by the following summations:

$$X_s = \sum_{n=1}^{p} X_s(n)$$

$$X_t = \sum_{n=1}^{p} X_t(n)$$

wherein $X_s(n)$ is $a_s(n)/(2\pi f_n)^2$, $X_t(n)$ is $a_s(n)/(2\pi f_n)^2$, $f_n$ is a dominant frequency in the Fourier transform, $a_s(n)$ is the acceleration amplitude of the environmental vibration site corresponding to $f_n$, $a_t(n)$ is the acceleration amplitude of the target site corresponding to $f_n$, and p is the number of dominant frequencies in the Fourier transform.

3. The method of claim 2 wherein in step (d) a transmissivity ratio is determined dividing $X_t$ by $X_s$.

4. The method of claim 1 wherein step (a) is accomplished with a first sensor placed at said environmental vibration site and a second sensor placed at said target site.

5. The method of claim 1 wherein step (a) is accomplished with a first sensor placed at said environmental vibration site and a second sensor placed at said target site.

6. The method of claim 1 wherein the signals is step (a) relayed to a signal conditioner and then to a computer and storage device.

7. The method of claim 1 wherein the signals is step (a) are preconditioned to enhance signal to noise ratio.

8. The method of claim 7 wherein the signals are amplified.

9. A method of characterizing environmental vibration transmissivity for machinery to be installed on a planned machinery foundation, the method comprising:
    (a) simultaneously monitoring and capturing vibration acceleration signals at an earth ground site through which environmental vibrations from an environmental vibrational source are transmitted, and at a target site wherein the target site is a planned machinery foundation site, one or more sites containing joints between elements of machinery to be placed on a foundation, and a combination thereof;
    (b) extracting amplitude and frequency data from the frequency representations of the domains of said signals;
    (c) quantifying displacement excitations from said data; and
    (d) providing transmissivity ratios by summing said displacement excitations at different frequencies at said earth ground site to produce a first sum and at said target site to produce a second sum and ratioing the first sum to the second sum, thereby indicating the relative vibrational transmissivity between said earth ground site and said target site.

10. The method of claim 9, in which the extraction step (b) is carried out by Fourier transformation.

11. The method of claim 9, wherein the displacement excitations are quantified for a linear system with sinusoidal excitation by the following summations:

$$X_s = \sum_{n=1}^{p} X_s(n)$$

$$X_t = \sum_{n=1}^{p} X_t(n)$$

wherein $X_s(n)$ is $a_s(n)/(2\pi f_n)^2$, $X_t(n)$ is $a_s(n)/(2\pi f_n)^2$, $f_n$ is a dominant frequency in the Fourier transform, $a_s(n)$ is the acceleration amplitude of the earth ground site corresponding to $f_n$, $a_t(n)$ is the acceleration amplitude of the target site corresponding to $f_n$, and p is the number of dominant frequencies in the Fourier transform.

12. The method of claim 11, wherein in step (d) a transmissivity ratio is determined dividing $X_t$ by $X_s$.

13. The method of claim 9, in which said environmental vibrational source is a remote manufacturing dynamic machine or a drive motor of a machine being analyzed.

14. The method of claim 9 wherein step (a) is accomplished with a first sensor placed at said earth ground site and a second sensor placed at said target site.

15. The method of claim 9 wherein step (a) is accomplished with a first sensor placed at said earth ground site and a second sensor placed at said target site.

16. The method of claim 9 wherein the signals is step (a) relayed to a signal conditioner and then to a computer and storage device.

17. The method of claim 9, wherein the signals is step (a) are preconditioned to reduce signal to noise ratio.

18. The method of claim 17 wherein the signals are amplified.

* * * * *